United States Patent [19]
Hirschfeld

[11] 3,928,554
[45] Dec. 23, 1975

[54] EMULSION DYEING
[75] Inventor: Tomas Hirschfeld, Framingham, Mass.
[73] Assignee: Block Engineering, Incorporated, Cambridge, Mass.
[22] Filed: Dec. 19, 1973
[21] Appl. No.: 426,356

[52] U.S. Cl. .................. 424/3; 8/25; 8/92; 8/93
[51] Int. Cl.² .................. G01N 1/00; G01N 1/30
[58] Field of Search .................. 424/3; 8/92, 93, 25

[56] References Cited
UNITED STATES PATENTS
3,464,778  9/1969  Berth .................................. 8/92
3,770,371  11/1973  Bossard et al. ..................... 8/92

Primary Examiner—Donald B. Moyer
Attorney, Agent, or Firm—Schiller & Pandiscio

[57] ABSTRACT

A technique for dyeing biological samples with dyes that are relatively insoluble in water or with combinations of dyes which are incompatible. The technique involves forming an emulsion of an immiscible solvent as the dispersed phase in water. The solvent can contain a very high concentration of a dye which is relatively insoluble in water, therefore constituting a reservoir for the diffusion of dye from the high concentration dispersed phase, through the water to the staining sites. In another aspect of the invention, one or more dispersed phases of dyes in immiscible solvents suspended in water provides a dye system for using a plurality of dyes which normally one would avoid mixing because they are incompatible. Additionally, another dyestuff can be dissolved in the water phase of the emulsion.

14 Claims, No Drawings

EMULSION DYEING

The present invention relates to biological staining, and more particularly a system for extending the range of feasible dyes and dye mixtures that are useable in biological staining.

It is known that the structure of biological i.e., histological samples can often be more clearly observed when the sample has been stained with a variety of different stains or dyes than with merely a single dye. The use of Wright's stain is an example of a combination stain which has found wide use. Because of the incompatability of the dyestuffs used however, one must frequently resort to successive staining with each of the several dyes. This technique of using successive stains is not feasible in a number of situations where it is desired to dye the sample simultaneously with several dyes, as in flow photometry staining.

The art has therefore sought to discover mixtures of dyes which are compatible with one another, i.e., will not substantially react with one another or interfere with the staining of the sample by one another. Typically, two or more dyes in a common solvent will react to form an insoluble precipitate, thereby reducing the dye concentration below a level at which they can adequately stain the sample, or heavily contaminating the sample with the reaction product, or the like. The reactivity among incompatible dyes can be reduced by limiting the concentration of the dyes in the solution, but to achieve adequate dyeing, the imbibition time of the sample in the dye solution tends to become much too long from a practical point of view. Particularly, limiting concentration of the dyes is not a useful technique with suspension staining procedures such as are used in flow photometric systems.

Similarly, there are a large number of dyes which are "insoluble" or sparingly soluble in water. It will be appreciated that even the insoluble dyes have a finite solubility which, however, may be very small. Since the liquid phase in biological specimens is aqueous, these dyes have been of little or no use in biological staining, primarily because the small amount of dye that will dissolve in water will be quickly exhausted by being bound to the specimen. In other words, because of the insolubility of the dye, the concentration levels of the dyebath are considerably too low to achieve proper dyeing.

Therefore, principal objects of the present invention are to provide a technique for dyeing or staining a biological sample simultaneously with a plurality of dyes which are ordinarily incompatible, and to provide a dye mixture for use in such a technique. Other objects of the present invention are to overcome many of the difficulties heretofore noted in using dyes which are ordinarily incompatible with one another or are aqueous insoluble, to stain biological samples.

Generally, the present invention is achieved by forming liquid-in-liquid suspensions (emulsions) of a substantially immiscible solvent in water, at least the solvent having dissolved therein a dyestuff. As will be shown, dyeing of a histological sample can be achieved from the emulsion because the concentrations of the dyestuff in the solvent can be maintained at a sufficiently high enough level to constantly replenish dye to the water to achieve adequate dyeing. Where dyes are dissolved both in the solvent and suspending water, the dyes can be applied simultaneously, and the technique permits the use of dyestuffs which would be incompatible with one another if dissolved in a common body of solvent.

Clearly, the present invention substantially extends the range of feasible dyes and dye mixtures for histological, and histological, staining.

Other objects of the present invention will in part appear obvious and will in part appear hereinafter. The invention accordingly comprises the processes involving the several steps and the relation and order of one or more of such steps with respect to each of the others, and the products and compositions possessing the features, properties and relation of elements which are exemplified in the following detailed disclosure and the scope of the application all of which will be indicated in the claims.

For most biological staining, it is desired to saturation stain, i.e., to load the sample with the maximum amount of dye that will bind to the latter. This requirement follows from the fact that the components of biological samples being examined microscopically are usually minute, and those components which one seeks to differentiate by dye color will thus bind very small amounts of dye at best. To achieve optimum color differentiation, the use of a maximum amount of dye that can be bound is thus desired. To do so, the concentration of stain molecules near each element being stained should be high enough to achieve saturation of all staining sites. The stain concentration gradient in the solution should be high enough to permit transportation of the dyes to the staining sites, and even after stain depletion by a partially completed staining process, the stain concentration should still be high enough to achieve saturation staining.

The concentration of stain therefore in any of the immiscible liquid phases of the invention should be high enough to meet the foregoing requirements and this can readily be achieved by providing a substantially greater amount of stain dissolved in each immiscible phase then is necessary to achieve total saturation staining of the desired sample by that dye alone from a simple solution of that dye.

The present invention can be most easily described in connection with an emulsion of two liquids in which a first liquid is considered a carrier solvent (assuming that it is the dispersed phase in the emulsion) and the second liquid is considered as the suspending medium (assuming that it is the dispersion medium in the emulsion). Preferably, both the solvents and medium are substantially immiscible with one another and as noted, for biologicals, the suspending solvent or medium is water. To avoid background matter, it is preferred that the solvent and suspending medium be optically matched with respect to their indices of refraction. The solvent preferably should have a high dye capacity, i.e., the particular dye held in the solvent used should have a high solubility in the latter.

It will be appreciated that each minute droplet of a dispersed phase of an immiscible solvent in a water suspension presents a solvent/water interface. As is known from Berthelot's distribution law, a dissolved substance will distribute itself through that interface in proportion to its solubilities in the two liquids. Consequently, if the droplets contain a high concentration of dye which is sparingly soluble in water, there will be a constant transfer of the dye into the water as the dye is taken up from the water by binding to a specimen. Consequently, each droplet serves as a high concentration reservoir to provide a continual replenishment of dye at low concentrations in the water. Because in an emulsion, there are a huge number of dye droplets, the staining sites on the specimen can be expected to have a reasonable number of dye droplets in very close proximity, thus minimizing the diffusion path for the dye between the adjacent droplet and the staining site.

The emulsion can be formed by mechanical agitation as by an ultrasonic mixer which breaks up the carrier solvent into minute droplets dispersed throughout the suspending medium, but purely mechanically formed emulsions tend to be unstable and hence should be used immediately or shortly after formation. The emulsions can be formed by any of known methods using an emulsifying agent selected so as to be non-reactive with either any of the dissolved dyestuffs of the histological specimen. For example, small amounts of known non-ionic detergents can be used as emulsifying agents.

Alternatively, each dye can be dissolved in mutually immiscible solvents and all of the solvents can then be suspended in yet a third liquid phase such as water with which none of the solvents are substantially immiscible. Alternatively, two or more incompatible dyes can be respectively dissolved in corresponding separate portions of a first solvent, each then emulsified with separate portions of a second medium immiscible with the first solvent, and the two emulsions then mixed together.

The stains which are useable in accordance with the present invention include an extremely wide variety of dyes, the only basic criteria for the selection of dye pairs or combinations being that each selected dye of a combination in soluble in a liquid vehicle to provide a dyebath of high enough concentration to achieve a saturation dyeing of the desired sample, and that the several vehicles in which the respective dyes are dissolved are substantially immiscible with one another or with a dispersion medium in which the respective dyebaths are suspended as a dispersed phase.

The principles of the present invention can be seen from consideration of the following examples:

EXAMPLE I

Two dye solutions are formed, one of 8-p-toluidino-1-napthalene-sulfonic acid (TNS) in benzyl alcohol at a concentration of about $10^{-4}$ molar, the other being 2,7 diamino-10 ethyl-9 phenyl phenanthridinium bromide, also known as ethidium bromide (EB), dissolved in water at a $10^{-4}$ molar concentration. The structure of EB is believed to be as follows:

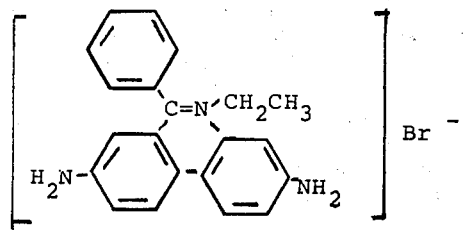

It is known that both EB and TNS dissolved in a common aqueous solvent at about $10^{-5}$ molar each, will react to precipitate out the insoluble salt ethidium-8-p-toluidino-1-naphthalene sulfonate.

An emulsion is formed by suspending 10 ml of the TNS-benzyl alcohol solution in about 20 ml of the aqueous solution of EB by mechanical agitation. The emulsion is applied to a biological sample (blood smear) for a period of approximately three minutes at room temperature. EB normally dyes nucleic acids of leukocytes to provide a strong red fluorescence at about 580–650 m$\mu$ when irradiated at 480–550 m$\mu$. TNS normally dyes eosinophil granules to provide a greenish fluorescence at 440–550 m$\mu$ when excited with light at about 320–410 m$\mu$. The leukocytes and eosinophils of the blood smear will be found to be dyed by the respective dyes, and substantially no precipitate due to dye reaction will be observed.

EXAMPLE II

Methyl green is regarded as incompatible with 4,4'-bis 4-(3-sulfoanilino) -6 [bis (2-hydroxy-ethyl)-amino]-1,3,5,triazin-2yl amino stilbene 2,2'-disulfonic acid tetrasodium salt (hereinafter referred to as LN) when both are commonly dissolved in water at $10^{-4}$ molar concentrations or higher, forming thereby a precipitate. LN is believed to have the following structure

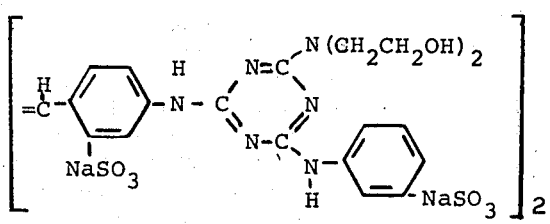

In the present example, methyl green is dissolved in a concentration as high as $1 \times 10^{-2}$ molar in methyl benzoate and used as the dispersed phase in an emulsion in which the suspension medium is an aqueous solution of $1 \times 10^{-4}$ molar LN buffered to pH 8.5 with 0.1 molar 2-amino-2-hydroxymethyl-1,3-propanediol HCl. After a staining time of ten minutes in the emulsion, a blood smear on a slide is washed and irradiated with light in the range of 320–390 m$\mu$. The protein of leukocytes and neutrophil granules will be seen to fluoresce strongly in the blue, due to LN staining, while basophil granules will exhibit strong green color on visual examination, due to dyeing by the methyl green. No apparent precipitate is observed.

EXAMPLE III

Separate solutions are formed by dissolving EB in methyl benzoate and TNS in benzyl alcohol. Each solution is formed into the dispersed phase in water, and the two emulsions are then mixed gently with one another. It will be observed that this combined emulsion will dye blood with substantially the same effect as the emulsion of Example I.

Since certain changes may be made in the above method and product without departing from the scope of the invention herein involved, it is intended that all matter contained in the above description or shown in the accompanying drawing shall be interpreted in an illustrative and not in a limiting sense.

What is claimed is:

1. A dyebath for histological staining comprising;
   an emulsion having a dispersed phase in a suspending aqueous medium, the dispersed phase including at least one dye dissolved in a solvent which is substantially immiscible with said medium.

2. A dyebath as defined in claim 1 having a second dye dissolved in said suspending medium.

3. A dyebath as defined in claim 2 wherein said first and second dyes have different solubilities with respect to at least one of said solvent and said suspending medium.

4. A dyebath as defined in claim 2 wherein said first and second dyes are incompatible with one another when dissolved in a common solvent.

5. A dyebath as defined in claim 1 wherein said dispersed phase includes droplets of a second dye dissolved in a second solvent which is substantially immiscible with said suspending medium.

6. A dyebath as defined in claim 1 wherein the optical indices of refraction of said medium and solvent are substantially matched.

7. A dyebath as defined in claim 1 wherein said dye is substantially insoluble in said medium.

8. A dyebath as defined in claim 1 wherein said dye is sparingly soluble in said medium.

9. A dyebath as defined in claim 1 wherein said solvent is methyl benzoate.

10. A dyebath as defined in claim 1 wherein said solvent is benzyl alcohol.

11. Method of staining a histological sample, comprising the steps of
    dissolving at least one dye in a first solvent which is substantially immiscible with water,
    forming with an aqueous solution, a first emulsion in which said dissolved dye in said solvent constitutes the dispersed phase, and
    applying said emulsion to said sample.

12. Method as defined in claim 11 wherein said solvent and dye are selected so that said dye is present in said solvent in a greater concentration than can be maintained by dissolution of said dye in water.

13. Method as defined in claim 12 including the step of dissolving a second dye in the aqueous phase of said emulsion prior to applying the latter to said sample.

14. Method as defined in claim 11 including the steps of dissolving a second dye in a second solvent which is substantially immiscible with water,
    forming, with an aqueous solution, a second emulsion in which said second dye dissolved in said second solvent constitutes the dispersed phase, and
    mixing said first and second emulsions together prior to applying them to said sample.

* * * * *